May 21, 1929. G. L. MOORE 1,714,184
METHOD OF DISTRIBUTING HEAVY LUBRICANTS
Filed Oct. 22, 1925
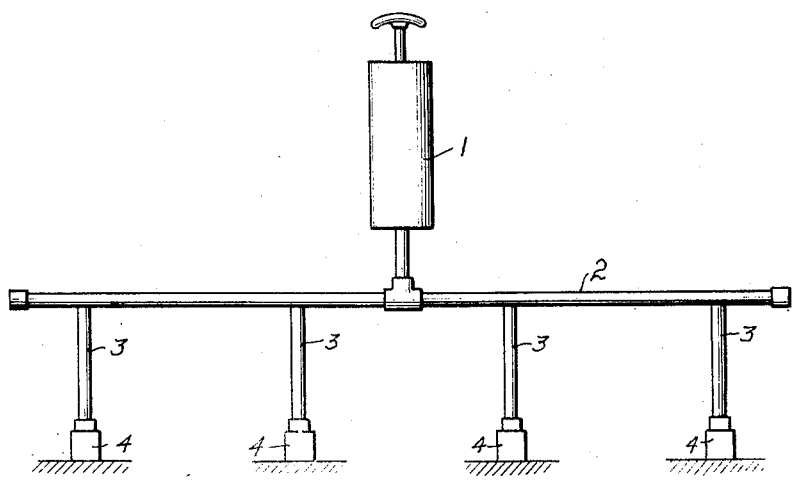
Inventor:
George L. Moore,
by Wm. F. Freudenreich,
Atty.

Patented May 21, 1929.

UNITED STATES PATENT OFFICE.

GEORGE L. MOORE, OF CHICAGO, ILLINOIS, ASSIGNOR TO STANDARD OIL COMPANY, OF WHITING, INDIANA, A CORPORATION OF INDIANA.

METHOD OF DISTRIBUTING HEAVY LUBRICANTS.

Application filed October 22, 1925. Serial No. 64,273.

It is becoming a common practice to equip automobiles with central lubricating systems instead of placing at each bearing to be lubricated a cup that must be filled from time to time by hand. This involves a series of pipes radiating from a central pump or pressure device, which pipes must be of comparatively small diameter and will usually contain one or more bends. The proper lubricant for the bearings is a comparatively heavy, viscous substance, such as engine oil and, because of the small cross-sectional area of the pipes and the more or less tortuous passage through which the lubricant must flow, it is practically impossible, in present systems, successfully to distribute the proper kind of oil. As a result, these systems employ a comparatively light oil that is much inferior in lubricating qualities to the lubricants that are employed in situations where a cup may be filled by hand.

The object of the present invention is to make it possible successfully to use the desirable, heavy lubricants in a central distributing system.

In carrying out my invention, I mix with the comparatively heavy viscous lubricant, such as an engine oil, a comparatively thin volatile liquid that will not injure the surfaces of the bearings when it comes in contact therewith; benzine or the like being suitable for this purpose. The resulting mixture is sufficiently fluid to enable it to pass readily from the central distributing station through the small and perhaps crooked pipes leading to the bearings, so that the mixture may be forced directly into the bearings or into measuring units that segregate small quantities of the lubricating material and prevent flooding of the bearings. I am aware of the fact that benzine and the like has been mixed with graphite and other heavy lubricating materials to permit the latter to be introduced into bearings, but my invention has a different purpose, as the lubricants which my invention contemplates will enter the bearings readily enough when they reach the ports or passages leading to the bearings. My purpose is to place these lubricants in such a condition that they may be delivered from a central distributing station, through small pipes, without employing excessive pressures, and without clogging the system in cold weather due to a stiffening of the lubricating material to such a degree that no flow will be produced through the pipes of the system no matter how much pressure is applied.

When my mixture reaches the bearings, the volatile constitutent evaporates and leaves a heavier bottom in the bearings so that the bearings are supplied with precisely the same lubricating material as though each had an individual cup into which the lubricating material may be poured from time to time from an oil can or grease gun.

The accompanying drawing illustrates diagrammatically a system in which my invention may be employed.

Referring to the drawing, 1 represents a pump or other pressure device constituting the central distributing station; 2 is a main pipe leading from the central station and having numerous branches 3, each of which is shown as leading to a measuring unit 4 at a point where a lubricant is to be delivered.

It will be seen that only a free flowing substance can successfully be forced from the central station to the various measuring units. However, if the heavy material is diluted with a volatile liquid, so that the resulting mixture is one that will flow freely, it is a simple matter to distribute the lubricant to many separated points located at considerable distances from the central station and connected thereto by small crooked pipes or conduits.

I claim:

1. The method of lubricating bearings from a distant source with a lubricant of high viscosity and a high coefficient of viscosity change responsive to temperature change, through a small conduit of comparatively great length, which consists in dissolving the said lubricant in a highly volatile solvent of low viscosity and low coefficient of viscosity change responsive to temperature change, thereby forming a solution of low viscosity, forcing the solution through the conduit to the bearing under pressure, and permitting the volatile solvent to evaporate from the solution at the bearing, thereby leaving a coating of the highly viscous lubricant on the surface of the bearing.

2. The method of lubricating bearings from a distant source with highly viscous lubricant, through a conduit having high resistance to flow, which consists in dissolving the viscous lubricant in a highly volatile solvent of low viscosity, thereby forming a solution of low viscosity, forcing the solution through the conduit to the bearing under pressure and permitting the volatile liquid to evaporate into the atmosphere at the bearing, thereby leaving a coating of the highly viscous lubricant on the surface of the bearing.

3. The method of lubricating a system of bearings which consists in connecting said bearings to a central point by means of a conduit system, and introducing a lubricant to the system at said central point under pressure, said lubricant having a low coefficient of viscosity change responsive to temperature, said lubricant consisting of a volatile portion of low viscosity and a non-volatile portion of high viscosity, whereby the difference between the pressures required to force the lubricant through the system at varying temperatures will be reduced to a minimum, discharging the lubricant at the bearings and permitting evaporation of the volatile portion thereof on the bearings.

4. The method of lubricating a system of bearings which consists in connecting said bearings to a central point by means of a conduit system, maintaining at such central point a uniform supply of lubricant consisting of a volatile portion of low viscosity and a non-volatile portion of high viscosity, introducing said lubricant to the system at said central point under pressure, the lubricant having a low coefficient of viscosity change responsive to temperature, whereby the difference between the pressures required to force the lubricant through the system at high temperature and at low temperature will be reduced to a minimum, and discharging the lubricant at the bearings and permitting evaporation of the volatile portion thereof on the bearings.

In testimony whereof, I sign this specification.

GEORGE L. MOORE.